US009644781B2

(12) United States Patent
Thiery et al.

(10) Patent No.: US 9,644,781 B2
(45) Date of Patent: May 9, 2017

(54) METHOD FOR MANUFACTURING VACUUM INSULATION PANELS

(71) Applicant: SAINT-GOBAIN ISOVER, Courbevoie (FR)

(72) Inventors: Julien Thiery, Paris (FR); Ulrich Passon, Karlsruhe (DE); Wolf Gerhards, Ladenburg (DE)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 14/889,287

(22) PCT Filed: May 7, 2014

(86) PCT No.: PCT/EP2014/059373
§ 371 (c)(1),
(2) Date: Nov. 5, 2015

(87) PCT Pub. No.: WO2014/180918
PCT Pub. Date: Nov. 13, 2014

(65) Prior Publication Data
US 2016/0116100 A1 Apr. 28, 2016

(30) Foreign Application Priority Data
May 7, 2013 (DE) .................. 10 2013 104 712

(51) Int. Cl.
F16L 59/02 (2006.01)
B32B 5/02 (2006.01)
(Continued)

(52) U.S. Cl.
CPC .............. F16L 59/02 (2013.01); B32B 3/04 (2013.01); B32B 5/02 (2013.01); B32B 15/14 (2013.01);
(Continued)

(58) Field of Classification Search
CPC .............. Y10T 156/10; Y10T 156/1002; Y10T 156/1052; Y10T 156/1062; E04B 1/803; F16L 59/065; Y02B 80/12
See application file for complete search history.

(56) References Cited

U.S. PATENT DOCUMENTS
4,726,974 A 2/1988 Nowobilski et al.
2004/0180176 A1 9/2004 Rusek, Jr.
(Continued)

FOREIGN PATENT DOCUMENTS
CN 101046272 A 10/2007
CN 102116402 A * 7/2011
(Continued)

OTHER PUBLICATIONS
German Office Action dated Mar. 1, 2014 corresponding to German 10 2013 104 712.2.
(Continued)

Primary Examiner — Carson Gross
(74) Attorney, Agent, or Firm — Nath, Goldberg & Meyer; Jerald L. Meyer; Stanley N. Protigal

(57) ABSTRACT

The invention relates to a method for manufacturing vacuum insulation panels with a fiber core, comprising the steps of: providing a core blank of fibers, compressing the core blank to a predetermined final thickness for forming the core, evacuating a foil sleeve enclosing the core up to a pressure of ≤1 mbar, and sealing the foil sleeve. The method according to the invention is characterized by the fact that, in the compression step, the core blank is arranged between two cover elements and is mechanically compressed therebetween, that the core is kept under compression pressure until the foil sleeve is sealed, and that the compression step is performed at the place of manufacture at room temperature without thermal impact. Thus, a method for manufacturing vacuum insulation panels with a fiber core can be improved such that it can be performed with reduced energy requirement and yet the insulating effect of the vacuum insulation panels does not suffer therefrom.

19 Claims, 2 Drawing Sheets

Figure 1:
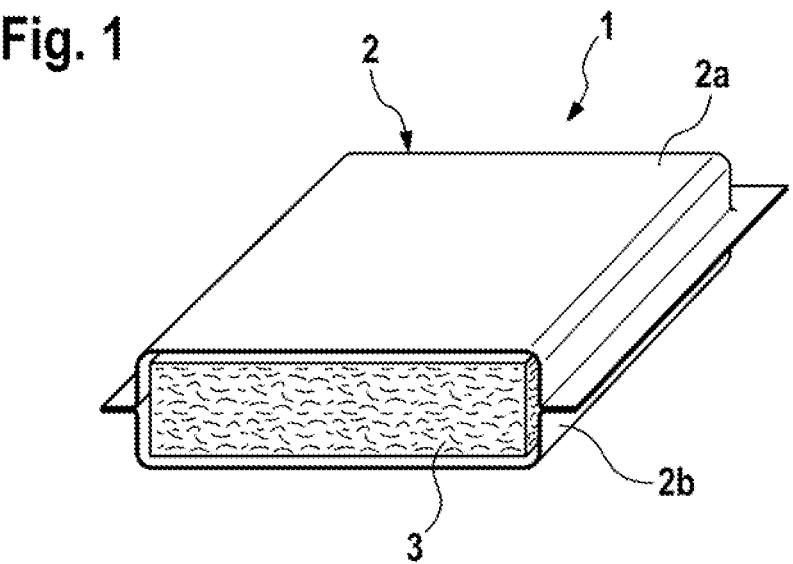

(51) Int. Cl.
  *B32B 37/18* (2006.01)
  *E04B 1/80* (2006.01)
  *B32B 15/14* (2006.01)
  *B32B 27/12* (2006.01)
  *B32B 27/30* (2006.01)
  *B32B 27/32* (2006.01)
  *B32B 27/34* (2006.01)
  *B32B 3/04* (2006.01)
  *F16L 59/065* (2006.01)
  *B32B 37/00* (2006.01)
  *B32B 37/14* (2006.01)

(52) U.S. Cl.
  CPC ............ *B32B 27/12* (2013.01); *B32B 27/302* (2013.01); *B32B 27/32* (2013.01); *B32B 27/34* (2013.01); *B32B 37/18* (2013.01); *E04B 1/803* (2013.01); *B32B 37/0007* (2013.01); *B32B 37/142* (2013.01); *B32B 2305/22* (2013.01); *B32B 2307/304* (2013.01); *B32B 2307/31* (2013.01); *B32B 2307/718* (2013.01); *B32B 2607/00* (2013.01); *F16L 59/065* (2013.01); *Y02B 80/12* (2013.01)

(56) References Cited

U.S. PATENT DOCUMENTS

2005/0175809 A1* 8/2005 Hirai .................... F16L 59/065
                                                                428/69
2008/0095970 A1* 4/2008 Takashima ............ F16L 59/065
                                                                428/69
2011/0123760 A1* 5/2011 Letourmy ............... C03B 37/04
                                                                428/114
2011/0274868 A1   11/2011 Nomura et al.

FOREIGN PATENT DOCUMENTS

| CN | 102301175 A | 12/2011 |
|---|---|---|
| DE | 202006002959 U1 | 5/2006 |
| DE | 102007042039 A1 | 3/2009 |
| DE | 102010019074 A1 | 11/2011 |
| EP | 1762662 A2 | 3/2007 |
| EP | 1926931 B1 | 12/2009 |
| EP | 1892452 B1 | 2/2012 |
| GB | 2451614 A | 2/2009 |
| JP | 2007-009928 A | 1/2007 |
| JP | 2007-092776 A | 4/2007 |
| JP | 2010-174975 A | 8/2010 |
| JP | 2012-062904 A | 3/2012 |

OTHER PUBLICATIONS

English translation of Chinese office action received Jul. 15, 2016, in corresponding application 201480026272.7, with office action in Chinese.
Chinese office action received Jul. 15, 2016, in corresponding application 201480026272.7.
Japanese office action received Jul. 14, 2016, in corresponding application 2016-512369, with English translation.
JP office action received Nov. 8, 2016, for JP counterpart application 2016-512369, with English machine translation.
Chinese Office Action dated Dec. 30, 2016 corresponding to application No. 201480026272.7.

* cited by examiner

METHOD FOR MANUFACTURING VACUUM INSULATION PANELS

This is a National Phase Application filed under 35 U.S.C. 371 as a national stage of PCT/EP2014/059373, filed May 7, 2014, an application claiming the benefit of German Application No. 102013104712.2, filed May 7, 2013, the content of each of which is hereby incorporated by reference in its entirety.

The invention relates to a method for manufacturing vacuum insulation panels with a fiber core, comprising the steps of: providing a core blank of fibers, compressing the core blank to a predetermined thickness for forming the core, evacuating a foil sleeve enveloping the core up to a pressure of $\leq 1$ mbar, and sealing the foil sleeve.

Such vacuum insulation panels are characterized by good heat insulation properties with comparatively small insulation thickness. Therefore, they are used primarily in areas in which the space available is restricted. As examples, refrigerators, freezers or the like have to be mentioned. In addition, such vacuum insulation panels are, however, also used for the insulation of buildings.

The known vacuum insulation panels have in common that they comprise a core of an open porous body which is adapted to be evacuated. This core is accommodated in a foil sleeve and is available under vacuum there. Thus, the gas heat conduction as well as the convection is largely prevented inside such a vacuum insulation panel, so that heat losses occur predominantly by solid body conduction and heat radiation.

As core materials, different open porous materials are used, such as for example foamed polyurethane or polystyrene, precipitated silica, pyrogenic silica, or the like. Due to the very low solid body conduction, fibers are also usual as a core material.

With the foil sleeves used, different modes of design are also common. Thus, composite plastic foils, e.g. in the form of a two-layer foil with a layer of HDPE of 150-200 μm and an aluminum layer of 6 to 20 μm are frequently used. Furthermore, multi-layer foils on a plastics basis are also known in which, for instance, several aluminized plastic foils of 20 to 50 μm each are connected with one another, whereof the aluminium layer thickness is typically less than 3 to 5 μm each. Such composite plastic foils have the advantage of being to provide at low cost and to process with little effort. In particular the gas-tight sealing of the foil sleeve can, as a rule, be performed without problems with plastic materials since appropriate welding seams and/or sealing seams can be produced without problems. Moreover, such composite plastic foils define relatively insignificant thermal bridges in the edge-side connection area. Due to the insufficient diffusion resistance, pure plastic foils play a role with niche applications only. They are basically unsuited for applications in which a useful life of the vacuum insulation panels of years or even decades is required, such as in the building sector.

A disadvantage of such composite plastic foil sleeves is, however, that they are not completely gas-tight. The gas molecules penetrating in the course of time will destroy the vacuum. Moisture that is also penetrating will lead to heat conduction in the interior of such vacuum insulation panels. Thus, the insulating effect may be reduced substantially in the long term. Another disadvantage of such plastic foil sleeves consists in the fact that they are relatively sensitive to mechanical damage. If such a mechanical damage occurs already during transportation and in the course of processing, the vacuum is directly lost and the insulating effect is largely abolished.

An alternative are foil sleeves on the basis of metal foils such as, for instance, stainless steel foils. Such metal foils are largely gas-tight, so that an almost unlimited lifetime can be achieved. Moreover, they offer high resistance to mechanical damage.

A disadvantage of such metal foil sleeves is, however, that quite substantial thermal bridges occur in the edge region due to the high thermal conductivity of the metal. They cause a distinct reduction of the insulating effect. Moreover, such metal foils are expensive to provide and complex to process. In particular, the welding of such metal foil sleeves is associated with much more effort than is the case with plastic foils.

In the overall design of such vacuum insulation panels, the core serves as a support body, so that it is conventionally provided as a relatively dimensionally stable molded body. If a fiber material is used for the core, a fiber material is usually employed which does not contain any binder that disintegrates under vacuum. Experience in practice has shown that negative effects are associated with the use of binders. If organic binders are used, they may disintegrate in the vacuum, so that the insulating effect then decreases due to increasing gas heat conduction. Although inorganic binders do not have this effect, they are difficult to handle and expensive.

For this reason, one has proceeded to use binder-free mineral wool and to compress it under thermal effect to form the core. This processing is performed irrespective of the respective composition of the mineral material as a rule in a temperature range between 400° C. and 600° C. and thus takes place in the range of the softening point thereof. Associated therewith is a plastic deformation of the mineral fibers which results in fiber mingling of the raw material, on the one hand, and in a kind of fusion, on the other hand. Thus, a relatively dimensionally stable, but still open porous core can be achieved. Examples of such procedures are to be found in documents U.S. Pat. No. 2,745,173, EP 1 892 452 B1, DE 601 24 242 T2 and EP 1 653 146 A1.

The procedures known therefrom have absolutely proven of value for achieving vacuum insulation panels with good insulating effects. They are also characterized by a relatively good manageability. However, these procedures are associated with very high energy consumption, which is in particular due to the high temperatures to be used. For this reason, the manufacturing of such mold cores of mineral wool is relatively expensive. Moreover, these method steps are also time-consuming, all the more so as the mold bodies manufactured still have to be cooled for further use. The instant invention starts out from the teaching of EP 1 653 146 A1.

It is therefore an object of the invention to avoid the disadvantages of prior art and to provide in particular a method for manufacturing vacuum insulation panels with a fiber core which can be performed with reduced energy requirement without the insulating effect of the vacuum insulation panels suffering therefrom.

This object is solved by a method with the features of claim 1. It is characterized in particular by the fact that, in the compression step, the core blank of fibers is arranged between two cover elements and is mechanically compressed therebetween, that the mechanical compression of the core is maintained until the foil sleeve is sealed, and that the compression step is performed at the place of manufacture at room temperature without thermal impact.

The instant invention thus turns completely away from the previous production method of the core for vacuum insulation panels. Instead of the energetically complex compressing under high temperatures, the core blank in accordance with the invention is now compressed in a cold state, which results in substantial reduction of the energy requirement.

Since, in accordance with the invention, the compression pressure is at the same time maintained until the production of the vacuum and the sealing of the foil sleeve, the associated, initially low dimensional stability of the core is no problem. In this respect, it was further found in the scope of the invention that the core blank that is compressed in a cold state only also forms, after the production of the vacuum, due to the ambient pressure a stable mold body serving as a support structure for the vacuum insulation panel thus manufactured. The manageability of a vacuum insulation panel manufactured with the method according to the invention is therefore comparable to that of a panel manufactured in accordance with the conventional method.

In other words, in the scope of the invention the fiber material is provided in a virtually loose condition and is formed to a mold body in the foil enclosure under the influence of the vacuum there. Its shape is predetermined by the predetermined thickness determined by the two cover elements between which the core is held under compression pressure until the foil sleeve is sealed. This constitutes a complete departure from the previous procedures.

After the lapse of the mechanical compression force the final thickness, i.e. the thickness of the evacuated finished VIP element (the influence of the foils, but not that of possible cover plates on the final thickness may be neglected) may, due to the pressure difference to the atmosphere available, deviate from the predetermined thickness, which is influenced essentially by the bulk density set. In practice, the final thickness may absolutely lie in the range of 50% to 200% of the predetermined thickness. For avoiding problems with respect to production technology it is preferred to keep the difference between the predetermined thickness and the final thickness as small as possible.

Since, in accordance with the invention, process time has to be taken into account neither for heating the core blank nor for cooling, the method can further be performed much quicker than in prior art. Moreover, the effort with respect to apparatus in the production line is also reduced quite substantially. Both effects reduce the costs of manufacturing of such vacuum insulation panels.

At the same time, the excellent insulating properties known can be achieved with the vacuum insulation panels manufactured by the method according to the invention.

Advantageous further developments of the method according to the invention are the subject matter of the dependent claims.

Thus, the foil sleeve may be formed of a metal foil and the core blank may be enclosed with the foil sleeve prior to the compression step, wherein foil sections thereof serve as the two cover elements. Then, the advantages of a metal foil as a foil sleeve can be used advantageously with respect to the gas tightness and the mechanical resilience also in the scope of the instant invention, and it is at the same time possible to use sections of these metal foils as the two cover elements between which the core blank is compressed. The advantageous inherent stability of such a metal foil is thus, in accordance with the invention, not only used as a protection from mechanical damage, but also functionally for the manufacturing process. The manufacturing method can thus become particularly simple. With respect to device technology this measure is also associated with very little effort.

Particularly advantageous properties can be achieved if a foil of stainless steel is used as a metal foil.

Alternatively it is also possible that the foil sleeve is formed of a composite plastic foil, wherein prior to the compression step two support plates serving as cover elements are additionally arranged at the large faces of the core blank, and wherein the support plates are formed of a pressure-resistant material not degassing under vacuum, in particular of metal. Then, it is not only possible to use the conventional advantages of plastic sleeves with respect to the low provision costs and the prevention of thermal bridges, but to achieve at the same time reliable compressing of the core blank due to the separately provided cover elements. Since these cover elements are formed of a pressure-resistant material not degassing under vacuum, improved surfaces without wrinkling, etc. can be achieved thereby as compared to vacuum insulation panels having a plastic foil sleeve only. It is of further advantage that these cover elements at the large faces of the core blank or of the core, respectively, distinctly reduce the susceptibility to damage of vacuum insulation panels thus manufactured. On the other hand, however, no aggravation of the insulating properties is associated therewith, since the two cover elements are not connected with one another in the side edge region of the core, so that thermal bridges are avoided in this place, above all if the support plates are made of metal.

Document DE 20 2006 002 959 U1 indeed discloses a vacuum insulation panel in which a core serving as a support body is enclosed with a plastic foil sleeve, wherein the support body, below the plastic foil sleeve, is enclosed with a two-part metal foil sleeve whose parts are not in direct, heat conductive contact with one another. A suggestion of a method in accordance with the invention does, however, not result from this prior art. In accordance with the teaching of this document it is an object to combine the advantages of the conventional plastic foil sleeves and metal foil enclosure. Thus, a largely gas-tight design is achieved by the two-part metal foil enclosure since small strip-shaped surface regions permitting gas passage are merely exposed at the side edges. On the other hand, a thermal bridge is avoided by this gap between the two metal foil enclosures. Since the two metal foil enclosures are glued with the plastic foil sleeve over the entire surface in a preferred embodiment of this prior art, improved protection from mechanical damage and wrinkle-free outer surfaces are achieved. As core materials, silica, aerogels or open-celled foams on PU or XPS basis are provided pursuant to this prior art, which are all virtually dimensionally stable during evacuation. The use of fiber cores is not addressed. Nor does this prior art make any indication of the method steps for providing the core. Therefore, DE 20 2006 002 959 U1 did not provide any suggestion for finding the method according to the invention.

In accordance with the invention it is in addition preferred that the fibers do not comprise any binder disintegrating in vacuum, in particular no organic binder.

The fibers may be formed of a thermoplastic material having no or only a very slight disintegration under vacuum conditions. Suitable fibers of this kind consist in particular of polyethylene, polyamide or polypropylene.

Likewise, inorganic fibers, preferably textile glass fibers or mineral wool such as glass wool or rock wool, or mixtures thereof, may be used. Textile glass fibers are usually manufactured by means of nozzle drawing procedures, mineral wool may be produced by means of a dry laid or a wet laid procedure. Mixtures of organic fibers, inorganic fibers or organic-inorganic fibers may also be used, which is, however, less preferred for reasons of process technology.

It is of further advantage if the providing of the core blank comprises the drying of the core blank up to a residual moisture of less than 0.1%. Then, it is possible to keep the amount of moisture trapped in the foil sleeve particularly small, so that the heat conduction is further reduced and thus an improved damping effect can be achieved. This plays a role in particular with inorganic fibers during the manufacturing of which aqueous dispersions, for instance, fluxing agents, are used. Thermoplastic fibers are usually produced directly from the flux without the presence of water, so that drying is usually not required.

Furthermore, the drying step may take place at a temperature being at least 200 K below the softening temperature of the fibers. Practical tests have revealed that, depending on the moisture content, drying temperatures of 120° C. to 200° C., on average about 150° C., are particularly effective, taking into account the drying time and the energy expenditure.

Furthermore, it is also possible that the providing of the core blank may comprise the providing of a felt web of fiber material and the cutting of the felt web to a predetermined finished size. The providing of the core blank can then be integrated very well into conventional process lines and can be performed efficiently. According to requirements, a stacking of a plurality of cut felt web sections may also be performed to achieve a desired layer of the core and hence the insulation thickness for the vacuum insulation panels.

Alternatively, a plurality of felt webs may also be arranged one on top of each other, and then the felt web stack may be cut to the predetermined finished size.

It is of further advantage if the step of evacuating of the core enclosed with the foil sleeve is performed up to a pressure of ≤0.05 mbar. By means of a vacuum improved this way, an even better heat insulating effect can be achieved. This can even be increased if the pressure inside the foil sleeve is reduced in the course of the evacuation step to a value of ≤0.01 mbar.

Furthermore, it has turned out advantageous if the core is compressed to a density of between 150 kg/m$^3$ and 350 kg/m$^3$ in the compression step. Thus, a very good inherent stability of the core can be achieved, wherein, on the other hand, the heat insulating effect continues to have an adequately high degree. For many applications a density of the core of approx. 250 kg/m$^3$ is particularly suited to meet these requirements opposing each other in a suitable manner. In the case of such density the core provides a particularly favorable support structure relative to the ambient pressure, namely sufficient mechanical strength against the ambient pressure with low solid body conduction of the fiber core and good evacuating ability due to its porosity.

If the mineral wool comprises fibers with a fiber fineness with a micronaire of less than or equal to 20 l/min, which is determined pursuant to the method described in WO 2003/098209 A1, a core with particularly good support properties in combination with excellent insulating values can be achieved. In practical tests it has turned out that these advantages are achieved in a particularly favorable manner if the fibers have a fiber fineness with a micronaire of less than or equal to 15 l/min.

Moreover, it has proved to be advantageous if the felt web comprises a weight per unit area of between 800 g/m$^2$ and 2500 g/m$^2$ prior to the step of drying. Thus, a core with particularly favorable properties can be achieved.

Figure 2:
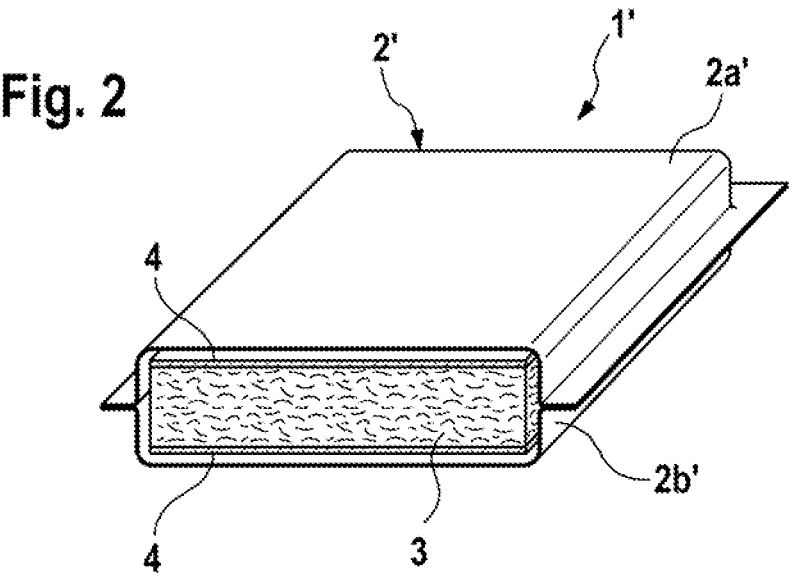
Figure 3:
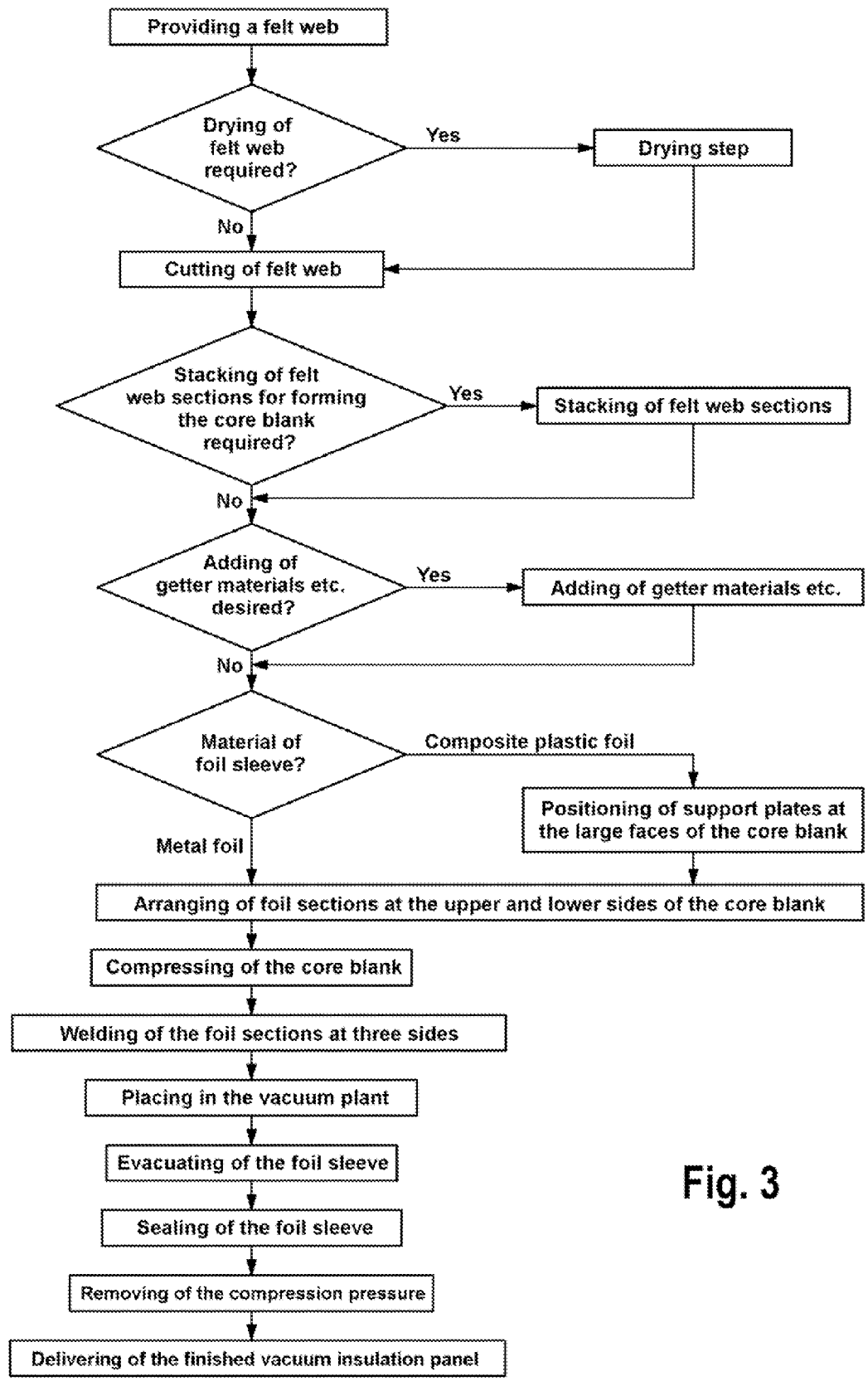

The method according to the invention will be explained in detail in the following by means of embodiments. There show:

FIG. 1 a schematic representation of a vacuum insulation panel according to a first embodiment;

FIG. 2 a schematic representation of a vacuum insulation panel according to a second embodiment; and FIG. 3 a flowchart of the method according to the invention.

In FIG. 1 a vacuum insulation panel 1 according to a first embodiment is illustrated schematically in section. It comprises a foil sleeve 2 entirely enclosing a core 3.

In the embodiment pursuant to FIG. 1 the foil sleeve 2 is formed of stainless steel and has a layer thickness of approx. 25 μm. It is formed of two foil sections 2a and 2b which are welded to one another in lateral edge regions of the core 3 at projecting edge sections. A vacuum in which the internal pressure is set to approx. 0.01 mbar is available inside the foil sleeve 2. Contrary to the schematic representation in FIG. 1, the foil sleeve 2 is therefore in close contact with the core 3 in practice, wherein the core 3 serves as a support body against the external pressure. The core 3 consists of a binder-free mineral wool, here glass wool.

In the following, a method for manufacturing the vacuum insulation panel 1 will be explained in detail by means of the flowchart illustrated in FIG. 3:

First of all, a core blank is produced. For this purpose, a felt web of binder-free mineral wool is provided. This felt web is typically supplied in a coil shape. As a rule, a foil is available between the winding layers which prevents mingling of the fibers of the layers among each other and thus contributes to maintaining the available weight per unit area. In the illustrated embodiment this felt web has a weight per unit area of approx. 2500 g/m$^2$ and consists of fibers with a fineness with a micronaire of 12 l/min.

The mineral wool of this felt web is then dried if required until the residual moisture has a value of less than 0.1%. To this end, the felt web is impacted with a temperature of approx. 150° C. for a period of approximately two minutes. This drying step of the mineral wool may be performed at the felt web as such and at cut felt web sections.

The cutting of the felt web is performed to a predetermined finished size which orients itself at the typical sizes of such vacuum insulation panels. Usual dimensions lie in the range of between 600 mm*300 mm and 1800 mm*1200 mm. Cutting may be performed with suitable known methods such as, for instance, with band saws, rotating knives, water jet cutting, punching, or the like.

In the instant embodiment, a plurality of felt web sections that have been cut in this manner are stacked on top of each other until sufficient mineral wool material, i.e. the layer required for producing the desired insulation thickness, is available.

Then, so-called getter materials, drying agents or the like are added to achieve particular functional improvements of the material of the core. These materials may be added as loose powder, sheets, etc.

Subsequently, the foil sections 2a and 2b are arranged at the upper and lower sides of the core blank thus formed. As was already explained above, these foil sections 2a and 2b are formed of stainless steel here. They serve as cover elements for the core blank in addition to their function as enclosure.

In the next step, the core blank available between the two cover elements, i.e. the foil sections 2a and 2b, is subjected to compression at a pressing power of approx. 100 kN/m$^2$ unterzogen. The compression of the core blank is performed until a predetermined thickness is achieved, which is approx. 4 cm in the illustrated embodiment. Thus, the core 3 is formed.

This compression is performed without thermal impact, that means without heating of the material of the core, and thus at room and/or ambient temperature at the place of manufacture. The density of the core 3 is set to approx. 250 kg/m$^3$.

In a further step the foil sections 2a and 2b are first of all welded to each other at three side edges, as may be seen from the projections in FIG. 1. The distance of the welding seam from the core 3 is restricted to few millimeters and amounts here to less than 5 mm.

While the foil sleeve 2 is thus closed at three sides, the core 3 remains under the compression pressure applied by the mechanical compression and in its predetermined thickness.

In this constellation the core 3 is placed in a vacuum plant along with the foil sleeve 2 and the interior of the foil sleeve 2 is evacuated to an internal pressure of approx. 0.01 mbar. The core 3 remains under the compression pressure until the foil sleeve 2 is sealed.

In a final step the foil sleeve 2 is then also closed at the remaining open place, so that the side edges of the foil sections 2a and 2b are then welded to each other over the entire surface.

Since the desired vacuum is then available in the interior of the foil sleeve 2, the mechanical compression may subsequently be cancelled. It is, however, preferred to maintain the mechanical compression until the pressure balance, i.e. the flooding of the vacuum chamber. By this measure it is possible to avoid a bulging in the vacuum which is possibly caused by reset forces of the core material.

With the parameters set there results a final thickness corresponding substantially to the predetermined thickness.

The transfer of the core blank provided with the foil sections 2a and 2b from one processing station to the next one is performed via suitable movable transport belts or roller conveyors as well as sheets between which the arrangement is transported by means of a feeder. In particular in the region of the vacuum plant these processes may be performed in a robot-controlled manner.

The vacuum insulation panel 1 thus formed is then ready for transportation and may be delivered.

FIG. 2 illustrates an alternative embodiment by means of a vacuum insulation panel 1'. It also comprises a foil sleeve 2' and a core 3. In this case, however, the foil sleeve 2' is designed as a composite plastic foil and comprises a two-layer structure of a HDPE layer with a thickness of 150 μm and an aluminum layer with a thickness of 6 μm. It comprises foil sections 2a' and 2b' which are also welded to each other at the edges thereof. Respective support plates 4 are arranged at the large faces of the core 3 which are formed of metal, here stainless steel. Their size corresponds substantially to the dimension of each large face of the core 3. The support plates 4 of the embodiment have a thickness of 50 μm.

The illustration in FIG. 2 is again only a schematic one since the foil sleeve 2' is actually in close contact with the core 3 and/or the support plates 4 due to the vacuum in the interior.

In the following, a procedure for manufacturing the vacuum insulation panel 1' will be explained in detail (cf. FIG. 3):

The first method steps until the providing of the foil sleeve 2' correspond substantially to those of the first embodiment. Reference is therefore made thereto. However, before the foil sections 2a' and 2b' are arranged at the core blank, the support plates 4 are positioned at the large faces of the core blank. This arrangement may be seen in FIG. 2. These support plates 4 serve as cover elements for load transfer, are designed with a thickness of approx. 1 mm and have therefore low heat conduction. Moreover, they are gas-tight since they are formed of stainless steel. These support plates 4 therefore encapsulate the core blank in the region of its large faces.

The subsequent compression step is performed under the same parameters as in the first embodiment. The compression pressure is distributed to the large faces of the core blank over the two support plates 4.

Subsequently, the foil sleeve 2' is closed at three sides by welding or sealing, respectively, the corresponding side edges of the foil sections 2a' and 2b'. Since such welding seams of the plastic foils can be folded away, it is not so essential in the scope of the second embodiment to set a particularly small distance of the welding seam from core 3. In the instant embodiment it is approx. 13 mm.

Subsequently, as already in the first embodiment, the arrangement is transported to the vacuum plant, maintaining the compression pressure on the core 3, and is evacuated there. Then, the foil sleeve 2' is closed at the remaining open side. Subsequently, the compression pressure is removed and the vacuum insulation panel 1' thus manufactured is finally finished and may be delivered.

Also in the scope of this second embodiment the compression step is performed without thermal impacting of the core material, i.e. without a special heating thereof. The process is performed at room or ambient temperature at the place of manufacture.

In both embodiments the manufacturing method is typically performed discontinuously outside the manufacturing line. Under certain conditions, for instance, if a felt web with suitable parameters (weight per unit area, etc.) can be produced directly, integration into a continuously operated manufacturing line is, however, also possible.

In the illustrated embodiments the entry of gas into the core 3—as with the vacuum insulation panel 1' according to FIG. 2—is prevented at least largely or else—as with the vacuum insulation panel 1 according to FIG. 1—practically completely. Thus, the vacuum insulation panels 1 and/or 1' have a particularly long lifetime, so that they can readily also be used in the building sector for insulating facades, cold store walls, or the like.

In addition to the embodiments explained, the invention allows for further design approaches.

Thus, instead of the stainless steel foil an aluminum foil or another metal foil may also be used for the foil sleeve 2. Likewise, instead of the composite foil in the second embodiment a multi-layer composite plastic foil with, for instance, multiple aluminizing may be used. In the case of minor requirements to the duration of functioning of few years, a plastic foil may also be used.

The support plates 4 explained in the scope of the second embodiment may moreover also be used complementarily with a foil sleeve of metal in an embodiment variant. Furthermore, the material and the thickness of the support plates 4 may deviate from the indications made. Materials which are not degassing or which are degassing to a very small extent only under vacuum are basically suited; for instance, plates of a suitable plastic material such as HDPE, polyamide, PVC or polypropylene may be used. The support plates 4 may preferably have layer thicknesses of between 25 μm and 500 μm.

Glass wool is provided here as a material for the core 3. Instead, however, rock wool, cinder wool, or other inorganic fibers such as textile glass fibers, etc. may also be used.

In the scope of the second embodiment it is further also possible to perform the compression step before the foil sleeve 2' is added. It is then arranged in the following step prior to evacuating, for instance in the region of roller conveyors, over the core 3 held under mechanical compression with the two support plates 4 at the large faces thereof.

Furthermore, it is not stringently necessary that the material of the core 3 is subjected to a drying step. The degree of drying may also vary in correspondence with the requirements for the application where applicable. Accordingly, the parameters for the drying step may also be adapted where appropriate.

The providing of the core blank may also be performed in some other way than the one explained above. It is in particular not necessary to provide a felt web in coil shape. It may, for instance, also be supplied directly from a forming chamber in which the felt web is produced from the mineral fibers just generated. The stacking of a plurality of felt web sections may possibly also be renounced. Alternatively it is also possible to fold a felt web in a suitable manner.

The addition of getter materials, drying agents or the like for achieving particular functional improvements of the material of the core may be performed on the felt web or on a felt web section prior to stacking, so that the getter materials are arranged in the stack and not on a surface. This has the advantage that the getters are not in direct contact with the foil sleeves or the support plates.

In the illustrated embodiment the evacuation of the vacuum insulation panel 1 or 1', respectively, is performed up to an internal pressure of 0.01 mbar. It is, however, also possible to admit a greater internal pressure of, for instance, 0.05 mbar or 0.1 mbar if the application purpose allows so. On the other hand, it may also be expedient for specific applications to lower the internal pressure even further to 0.001 mbar, for instance.

In the illustrated embodiments the core 3 is compressed to a density of approx. 250 kg/m$^3$ in the compression step. Depending on the application it is, however, also possible to set another suitable density in the range of 150 to 350 kg/m$^3$, for instance, 175 kg/m$^3$ or 200 kg/m$^3$.

Likewise, it is not necessary to use fibers with the indicated fiber fineness corresponding to a micronaire of 12 l/min. For many applications it might also be sufficient to use coarser fibers with a micronaire of less than 20 l/min.

The weight per unit area of the felt web prior to the drying step may also vary as a function of the requirements given.

The invention claimed is:

1. A method for manufacturing vacuum insulation panels (1; 1') with a core (3) of fibers, comprising the steps of:
   providing a core blank of fibers,
   arranging a foil sleeve (2; 2') over the core blank of fibers, and having foil sections (2a, 2b) thereof arranged at the upper and lower sides of the core blank of fibers,
   subsequent to arranging the foil sleeve (2; 2') over the core blank of fibers, compressing the core blank to a predetermined thickness for forming the core (3),
   wherein in the compression step the core blank is arranged between two cover elements and is mechanically compressed therebetween, and
   wherein the compression step is performed at the place of manufacture at room temperature without thermal impact,
   welding the foil sleeve (2; 2') on three sides while maintaining the compression;
   evacuating the foil sleeve (2; 2') enclosing the core (3) up to a pressure of ≤1 mbar, and
   sealing the foil sleeve (2; 2') wherein the mechanical compression of the core (3) is maintained until the foil sleeve (2; 2') is sealed, and while maintaining the core (3) in the evacuated state.

2. The method according to claim 1, characterized in that the foil sleeve (2) is formed of a metal foil, and that the core blank is enclosed with the foil sleeve (2) prior to the compression step, wherein foil sections (2a, 2b) thereof serve as the two cover elements.

3. The method according to claim 1, characterized in that the foil sleeve (2') is formed of a composite plastic foil, wherein, prior to the compression step, two support plates (4) serving as cover elements are additionally arranged at large faces of the core blank, and wherein the support plates (4) are formed of a pressure-resistant metal or plastic material not degassing under vacuum.

4. The method according to claim 1, characterized in that the fibers do not comprise any organic binder disintegrating in vacuum.

5. The method according to claim 1, characterized in that the fibers are organic fibers of a thermoplastic material selected from the group consisting of polyethylene, polyamide, or polypropylene.

6. The method according to claim 1, characterized in that the fibers are inorganic fibers, selected from the group consisting of mineral wool, glass wool, rock wool, and textile glass fibers.

7. The method according to claim 6, characterized in that the providing of the core blank comprises drying of the inorganic fibers of the core blank up to a residual moisture of <0.1%.

8. The method according to claim 7, characterized in that the step of drying is performed at a temperature ranging at least 200 K below the softening temperature of the fibers.

9. The method according to claim 1, characterized in that the providing of the core blank comprises providing at least one felt web section of fibers, and cutting of the felt web to a predetermined finished size, and in the case of providing a plurality of felt webs, stacking the plurality of cut felt web sections.

10. The method according to claim 1, characterized in that the step of the evacuating of the core (3) enclosed with a foil sleeve (2; 2') is performed up to a pressure of ≤0.05 mbar.

11. The method according to claim 1, characterized in that in the step of compression the core (3) is compressed to a density of approximately 250 kg/m$^3$.

12. The method according to claim 1, comprising using, as the fibers, mineral wool, wherein the mineral wool comprises fibers with a fiber yarn count corresponding to a micronaire of less than or equal to 20 l/min.

13. The method according to claim 9, characterized in that the felt web comprises a weight per unit area of between 800 g/m$^2$ and 2500 g/m$^2$ prior to drying.

14. The method according to claim 1, characterized in that the foil sleeve (2) is formed of a stainless steel foil, and that the core blank is enclosed with the foil sleeve (2) prior to the compression step, wherein foil sections (2a, 2b) thereof serve as the two cover elements.

15. The method according to claim 1, characterized in that the foil sleeve (2') is formed of a composite plastic foil, wherein, prior to the compression step, two support plates (4) serving as cover elements are additionally arranged at large faces of the core blank, and wherein the support plates (4) are formed of a pressure-resistant HDPE, polyamide, PVC, or polypropylene plastic material not degassing under vacuum.

16. The method according to claim 1, characterized in that the fibers comprise organic fibers of a thermoplastic material.

17. The method according to claim 1, characterized in that the step of the evacuating of the core (3) enclosed with a foil sleeve (2; 2') is performed up to a pressure of ≤0.01 mbar.

18. The method according to claim 1, characterized in that in the step of compression the core (3) is compressed to a density of between 150 kg/m$^3$ and 350 kg/m$^3$.

19. The method according to claim 1, comprising using, as the fibers, mineral wool, wherein the mineral wool comprises fibers with a fiber yarn count corresponding to a micronaire of less than or equal to 15 l/min.

\* \* \* \* \*